United States Patent
Johnson et al.

(10) Patent No.: US 8,906,542 B2
(45) Date of Patent: Dec. 9, 2014

(54) SODIUM CHALCOGENIDE ELECTRODES FOR SODIUM BATTERIES

(71) Applicants: UChicago Argonne, LLC, Chicago, IL (US); Indiana University Research & Technology Corporation, Indianapolis, IN (US)

(72) Inventors: Christopher Johnson, Naperville, IL (US); Youngsik Kim, Fishers, IN (US); Eungje Lee, Naperville, IL (US); Wen Chao Lee, Indianapolis, IN (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 13/709,877

(22) Filed: Dec. 10, 2012

(65) Prior Publication Data

US 2014/0065465 A1 Mar. 6, 2014

Related U.S. Application Data

(60) Provisional application No. 61/696,173, filed on Sep. 1, 2012.

(51) Int. Cl.

| | | |
|---|---|---|
| H01M 2/24 | (2006.01) | |
| H01M 6/42 | (2006.01) | |
| H01M 10/056 | (2010.01) | |
| H01M 10/054 | (2010.01) | |
| H01M 10/0525 | (2010.01) | |
| H01M 4/525 | (2010.01) | |
| H01M 4/485 | (2010.01) | |

(52) U.S. Cl.
CPC .......... *H01M 10/056* (2013.01); *H01M 10/054* (2013.01); *H01M 10/0525* (2013.01); *H01M 4/525* (2013.01); *H01M 4/485* (2013.01)
USPC .......................................................... 429/158

(58) Field of Classification Search
CPC . Y02E 60/122; Y02E 60/12; H01M 10/0525; H01M 10/052; H01M 4/485; H01M 4/525; H01M 4/581
USPC ............ 429/104, 144, 158, 220, 231.4, 231.9
See application file for complete search history.

(56) References Cited

U.S. PATENT DOCUMENTS

| | | | | |
|---|---|---|---|---|
| 4,452,777 | A * | 6/1984 | Abraham et al. | 429/104 |
| 7,759,008 | B2 * | 7/2010 | Barker et al. | 429/231.8 |
| 2005/0238961 | A1 * | 10/2005 | Barker et al. | 429/231.4 |
| 2011/0052986 | A1 * | 3/2011 | Barker et al. | 429/220 |
| 2011/0171513 | A1 * | 7/2011 | Kuze et al. | 429/144 |
| 2012/0021273 | A1 * | 1/2012 | Ohmori et al. | 429/144 |

\* cited by examiner

*Primary Examiner* — Stewart Fraser
(74) *Attorney, Agent, or Firm* — Olson & Cepuritis, Ltd.

(57) ABSTRACT

A sodium-ion electrochemical cell described herein comprises a cathode, an anode, and a non-aqueous sodium-containing electrolyte therebetween. The electrolyte comprises a sodium salt dissolved in a liquid organic carrier. The cathode comprises at least one transition metal chalcogenide compound in an initial discharged or partially discharged state and having the formula $Na_xMX_2Cl_n$, wherein $0<x\le 1$; M is at least one transition metal having a +3, +4, or +5 fully discharged oxidation state, i.e., when x is 1. X is at least one chalcogen selected from the group consisting of S and Se, and n is 0 when the discharged oxidation state of M is +3, n is 1 when the discharged oxidation state of M is +4, and n is 2 when the discharged oxidation state of M is +5. In some embodiments, the cathode comprises $Na_xVS_2$, $Na_xTiS_2$, or a combination thereof.

23 Claims, 16 Drawing Sheets

(a)  (b)  (c)

SODIUM CHALCOGENIDE ELECTRODES FOR SODIUM BATTERIES

CROSS-REFERENCE TO RELATED APPLICATIONS

This application is a non-provisional of U.S. Provisional Application Ser. No. 61/696,173, filed on Sep. 1, 2012, which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials and electrochemical cells for sodium-ion batteries. More particularly, this invention relates to cathode materials including sodium-transition metal chalcogenide materials, as well as electrochemical cells, and batteries comprising such materials.

BACKGROUND

Sodium-ion batteries have exciting energy storage potential for a large number of applications. Cost is an important factor in transportation batteries and other large format applications because of their sheer size (amount of packed energy) and the number of electrodes that must be integrated into the battery pack. A battery that uses Na ions instead of Li ions is attractive, for example, due to potential cost advantages for sodium relative to lithium. Sodium carbonate (also known as "soda ash" and the mineral "trona") is a major potential resource for Na-ion battery materials. The United Stated Geological Survey has estimated that, as of 2011, reserves of sodium carbonate in the U.S. are in the range of about 23 billion tons, at an as-mined cost of only about $135 per ton. Battery pack engineering modeling calculations estimate that a Na-ion battery operating at 3.3 V, employing an anode (negative electrode) with a capacity of 500 mAhg$^{-1}$, and a cathode with a capacity of 200 mAhg$^{-1}$, will provide upwards of 15% to 20% higher energy density (210 Whkg$^{-1}$, gravimetric basis) compared to current Li-ion batteries.

Na-ion cathode and anode materials have seen some recent major advances. There are only a few studies of carbon and alloy anodes in the current scientific literature. The list of cathode materials is much larger, however, including layered oxides, poly-anionic materials, fluorides, framework oxides, NASICONs, and sulfate-fluorides. While there are many examples of cathodes in the literature, there are limitations to the structures that can be used. The Na ion is about 55% larger in radius than Li ion, and prefers only octahedral coordination (6-coordinate bonding), as opposed to the preferred tetrahedral coordination (4 coordinate bonding) of lithium. Consequently, it is difficult to find a suitable host material to accommodate Na ions and allow reversible and rapid ion insertion and extraction.

Various transition metal sulfides can be employed in Na batteries, as well. The early first-row transition metal layered sulfides possess suitable electrochemical properties, and the first work was directed primarily to binary metal sulfides, most notably, the prototype intercalation electrode, $TiS_2$. The $Ti(+3)/(+4)$ redox couple is about 1.8 to 2.0 V versus Na. Layered $TiS_2$ provides soft bonding of Na to the sulfide atoms in the layers, and large gallery space between transition metal (TM) layer slabs to fit Na$^+$, which allows facile reversible electrochemical intercalation and deintercalation (also referred to herein, for convenience, as "(de)intercalation"). The electrochemical properties of other disulfides such as $VS_2$, $TaS_2$, $ZrS_2$, $NbS_2Cl_2$ have been elaborated by Abraham et al., (Solid State Ionics, 1982:7, 199) in molten salt cells, but because of the molten-salt nature of the electrolytes, these electrodes were operated at 130° C.

There is an ongoing need for sodium cells that can be operated at lower temperatures, such as ambient room temperature (e.g., 20 to 25° C.). The electrochemical cells described herein address this need.

SUMMARY OF THE INVENTION

A sodium-ion electrochemical cell described herein comprises a cathode, an anode, and a non-aqueous sodium-containing electrolyte therebetween. The electrolyte comprises a sodium salt dissolved in a liquid organic carrier. The cathode comprises at least one transition metal chalcogenide compound in an initial discharged or partially discharged state and having the formula $Na_xMX_2Cl_n$, wherein $0<x\le1$; M is a transition metal having a +3, +4, or +5 fully discharged oxidation state, i.e., when x is 1. X is at least one chalcogen selected from the group consisting of S and Se; and n is 0 when the discharged oxidation state of M is +3, n is 1 when the discharged oxidation state of M is +4, and n is 2 when the discharged oxidation state of M is +5.

In some embodiments, M is a transition metal selected from the group consisting of V, Ti, Ta, Zr, and Nb. Preferably M is V or Ti. A preferable chalcogen, X, is sulfur. The cathode can include a single transition metal chalcogenide compound or more than one transition metal chalcogenide compound of formula $Na_xMX_2Cl_n$. When multiple transition metal chalcogenide compounds are utilized, the compounds can be present in distinct domains comprising substantially a single compound, in a mixed domain in which one or more transition metal ions are randomly distributed in the crystal structure thereof, or the compounds can be present in a combination of individual domains and mixed domains. In some embodiments, the at least one transition metal chalcogenide compound comprises comprises $Na_xVS_2$, $Na_xTiS_2$ or a combination thereof.

Preferably, the transition metal chalcogenide compound is a particulate material. In some embodiments, the particulate transition metal chalcogenide compound is formed into an electrode, e.g., by compression, optionally in combination with a binder. In other preferred embodiments, the particulate transition metal chalcogenide compound is coated on a metal current collector (e.g., a metal selected from the group consisting of aluminum, stainless steel, copper, nickel, and an alloy of two or more of the foregoing metals), optionally along with a particulate carbon material and a binder (e.g., poly(vinylidene difluoride)).

Preferably, the liquid organic carrier comprises at least one solvent selected from an organic carbonate, an organic ether, an organic ester, and an organic nitrile. The sodium salt preferably comprises a salt selected from the group consisting of $NaPF_6$, $NaBF_4$, $NaF_2BC_2O_4$, $NaB(C_2O_4)_2$, $NaClO_4$, $NaAsF_6$, $NaN(SO_2CF_3)_2$, $NaC(SO_2CF_3)_3$, $NaSO_3CF_3$, and $NaPF_3(CF_2CF_3)_3$.

In some preferred embodiments, the electrochemical cell comprises a cathode, an anode, and a non-aqueous sodium-containing electrolyte therebetween; wherein the cathode comprises at least one transition compound of formula $Na_xMS_2$, wherein $0<x\le1$; M is V or Ti; and the electrolyte comprises a sodium salt dissolved in a liquid organic carrier comprising at least one solvent selected from an organic carbonate, an organic ether, an organic ester, and an organic nitrile.

In another aspect, the present invention provides a sodium-ion battery comprising a plurality of electrochemical cells as described herein electrically connected together in series, in parallel, or a combination of series and parallel.

BRIEF DESCRIPTION OF THE DRAWINGS

The invention includes certain novel features and a combination of parts hereinafter fully described, illustrated in the accompanying drawings, and particularly pointed out in various aspects of the invention, it being understood that various changes in the details may be made without departing from the spirit, or sacrificing any of the advantages of the described invention.

DETAILED DESCRIPTION OF THE PREFERRED EMBODIMENTS

Figure 1:
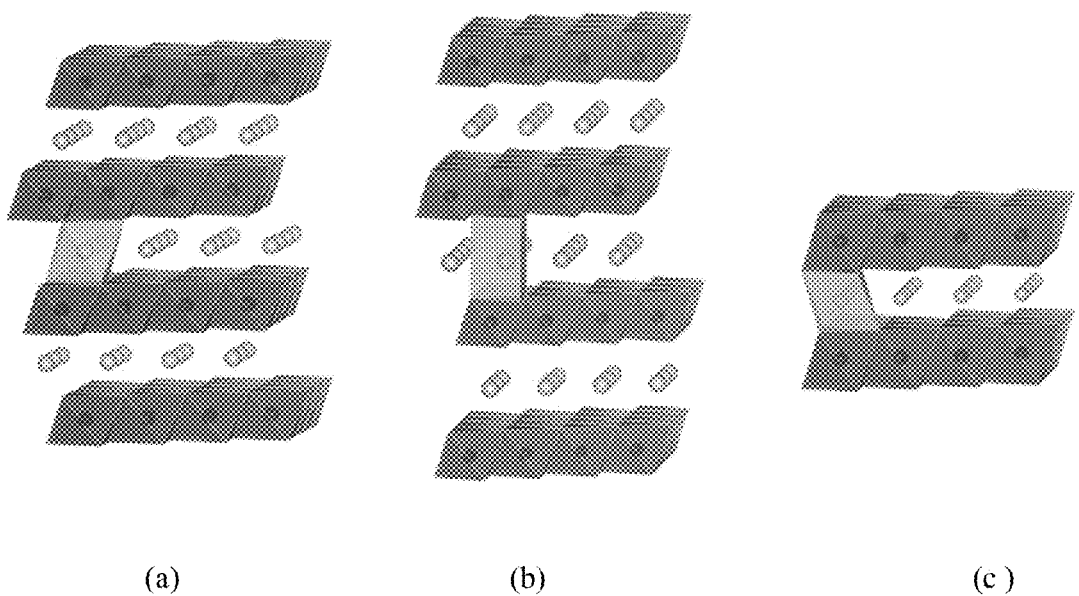
FIG. 1 depicts a schematic diagram of (a) O3-type, (b) P3-type, and (c) O1-type layered structures; darker gray and lighter gray spheres represent, respectively, transition metal and alkali metal ions; darker gray polyhedra represent $MO_6$ octahedral units (M=transition metal).

Novel electrochemical cells and batteries are described herein. The electrochemical cell comprise a cathode, an anode, and a non-aqueous sodium-containing electrolyte therebetween. The cathode comprises at least one transition metal chalcogenide compound in an initial discharged or partially discharged state and having the formula comprising, consisting essentially of, or consisting of $Na_xMX_2Cl_n$, wherein $0<x\le1$; M is a transition metal having a +3, +4, or +5 fully discharged oxidation state, i.e., when x is 1. X is at least one chalcogen selected from the group consisting of S and Se; and n is 0 when the discharged oxidation state of M is +3, n is 1 when the discharged oxidation state of M is +4, and n is 2 when the discharged oxidation state of M is +5. The electrolyte comprises a sodium salt dissolved in a liquid organic carrier.

As used herein with respect to transition metal chalcogenide compounds, the term "discharged" refers to the state of maximum sodium content (i.e., x=1 in the formula $Na_xMX_2Cl_n$); whereas the term "partially discharged" refers to states in which the material comprises some sodium, but less than the maximum level (i.e., $0<x\le1$ in the formula $Na_xMX_2Cl_n$). The term "discharged oxidation state" as used herein in reference to a transition metal ion, M, refers to the oxidation state of M when the material is in the maximum sodium ion content, i.e., when x in the formula $Na_xMX_2Cl_n$ is 1.

In some embodiments, M is vanadium (V), titanium (Ti), tantalum (Ta), zirconium (Zr), or niobium (Nb). M preferably is V or Ti; while X preferably is sulfur (S). In some embodiments, the cathode comprises a transition metal chalcogenide compound of formula $Na_xMS_2$ in which M is V or Ti; or the electrode comprises a transition metal chalcogenide compound of formula $Na_xVS_2$ and a transition metal chalcogenide compound of formula $Na_xTiS_2$. In any of the forgoing embodiments, the transition metal chalcogenide compounds can be present in distinct domain structures each comprising a single transition metal, in a mixed domain structure comprising more than one transition metal, or a combination thereof.

The cathode preferably comprises a layer of the transition metal chalcogenide compound on a metal current carrier, which can be composed of any metal sheet or foil suitable for use in alkali metal ion batteries and cells. Non-limiting examples of current collector materials include aluminum, stainless steel, copper, nickel, and alloys thereof (e.g., in the form of a foil).

The layer of transition metal chalcogenide compound preferably comprises transition metal chalcogenide particles, optionally in combination with another material, such as carbon (e.g., particulate carbon), and held together by a binder. In some embodiments, the particles of the transition metal chalcogenide compound are nano-sized particles (e.g., particles with average diameters in the range of about 0.01 to about 100 nm; also referred to herein as "nanoparticles"), micro-sized particles (e.g., particles with average diameters in the range of greater than 100 nm to about 10 micrometers; also referred to herein as "microparticles"), coarse particles (e.g., particles with average diameters in the range of greater than 10 micrometers to about 1 mm), or any combination thereof.

When carbon particles are utilized in the cathode, the carbon can be in the form of carbon nanotubes, carbon nanoparticles, carbon microparticles, coarse carbon particles having diameters in the range of greater than 10 micrometers to about 1 mm, or any combination thereof. Preferably, the carbon comprises carbon nanotubes, and/or graphitic carbon in the form of carbon nanoparticles, carbon microparticles, or a combination thereof.

The anode can be formed on any material capable of accepting sodium during charging. Examples of suitable anode materials include carbon materials such as sodium metal, graphite, carbon nanotubes, and the like, optionally in combination with another material, and e.g., can be coated on a metal current collector as in the case of the cathode.

Preferably, the anode and cathode are separated from one another by a porous separator through which the electrolyte can pass. Suitable separator materials are well known in the art and are described by P. Arora and Z. Zhang (*Chem. Rev.*, 2004; 104: 4419-4462), which is incorporated herein by reference in its entirety. The presence of a separator helps to prevent short circuits. The separator is a porous (e.g., foam), electrically insulating material that is imbibed or impregnated with the electrolyte and holds the electrolyte in place. The separator can be a separate sheet of material or can be deposited onto one or both of the electrodes. Non-limiting examples of separator materials include microporous polymeric materials (e.g., polyethylene or polypropylene), an nonwoven materials (e.g., single polyolefin, or a combination of polyolefins, such as polyethylene (PE), polypropylene (PP), polyamide (PA), poly(tetrafluoroethylene) (PTFE), poly(vinylidene difluoride) (PVdF), and poly(vinyl chloride) (PVC)).

The electrolyte of the electrochemical cells and batteries described herein comprises, consists essentially of, or consists of a sodium salt dissolved in a liquid organic carrier.

The organic carrier component of electrolyte can be composed of a single solvent or a combination of two or more solvents. The solvent or solvents of the electrolyte can comprise, consist essentially of, or consist of any organic solvent that is suitable for use in non-aqueous alkali metal ion (e.g., lithium or sodium ion) batteries. Such solvents are well known in the battery art, and include, for example, organic carbonates (e.g., ethylene carbonate, propylene carbonate, ethyl methyl carbonate, and the like), ethers (e.g., diethyl ether, tetrahydrofuran, 2-methyl tetrahydrofuran, dimethoxyethane, and 1,3 dioxolane), esters (e.g., methyl formate, gamma-butyrolactone, and methyl acetate), and nitriles (e.g., acetonitrile). In some preferred embodiments, the carrier solvent comprises, consists essentially of, or consist of one or more organic carbonates such as ethylene carbonate (EC), propylene carbonate (PC), dimethyl carbonate (DMC), diethyl carbonate (DEC), ethyl methyl carbonate (EMC), or a combination of two or more of the foregoing carbonates. Examples of some preferred solvents include propylene carbonate, and mixtures of ethylene carbonate and ethyl methyl carbonate in an EC/EMC volume or weight ratio of about 3/7.

The sodium salt component of the electrolyte can comprise, consist essentially or, or consist of any sodium salt or combination of salts that can be dissolved in the liquid organic carrier for use in a sodium-ion battery cell. Non-limiting examples of some suitable lithium salts include $NaPF_6$, $NaBF_4$, $NaF_2BC_2O_4$, $NaB(C_2O_4)_2$, $NaClO_4$, $NaAsF_6$, $NaN(SO_2CF_3)_2$, $NaC(SO_2CF_3)_3$, $NaSO_3CF_3$, and $NaPF_3(CF_2CF_3)_3$. The concentration of sodium salt in the electrolyte can be any concentration suitable for used as an electrolyte in a sodium-ion cell. Preferably, the concentration of sodium salt in the carrier is in the range of about 0.1 molar (M) to about 5 M, more preferably about 1 M to about 1.5 M (e.g., about 1.2 M).

The following non-limiting examples are provided to illustrate certain aspects and features of the electrochemical cells and batteries described herein.

EXAMPLE 1

Synthesis of $Na_xVS_2$

Amounts of $Na_2S$ (Aldrich), S (Alfa, 99.999%), and V (Aldrich, 99.5%) suitable to obtain an approximate 1:1:2 molar ratio of Na:V:S, were mixed together under an Ar atmosphere in a glove box and placed in a carbon-coated quartz tube that was then sealed under vacuum. The tube was heated slowly over about 20 hours to about 750° C., held for three days at 750° C., and then cooled slowly over about 5 hours to about 250° C., followed by quenching in air. The resulting product was removed from the tube and thoroughly ground and pelletized, all under an Ar atmosphere in a glove box. The pelletized product was then re-heated, cooled, ground and re-pelletized under the same processing conditions, to obtain a final $Na_xVS_2$ product for testing. Since this compound is moisture-sensitive, it was always handled in an Ar or He atmosphere. The $Na_xVS_2$ product is believed to comprise domains of O3 and P3 stacking geometry. FIG. 1 provides a schematic representation of O3 and P3 stacking in Panels (a) and (b), respectively.

EXAMPLE 2

Preparation of Electrodes and Electrochemical Cells $Na_xVS_2$-containing disk electrodes and electrochemical cells were prepared in a glove box under a He atmosphere. The electrodes were fabricated from a 70:20:10 (wt %) mixture of active material-to-acetylene black-to-polytetrafluoroethylene (as a binder). Acetylene black was utilized as a carbon-based as current conductor. Electrochemical half-cells (size 2032) were constructed using 1M $NaClO_4$ in a 1:1 mixture of ethylene carbonate (EC) and diethyl carbonate (DEC) as an electrolyte, along with the $Na_xVS_2$-containing electrode, and sodium metal foil as a counter electrode. The sodium metal foil was punched out from rolled sodium chunks (Aldrich, 99%) that were cleaned of any oil using hexanes. The typical electrode mass and thickness were about 5 to about 10 mg weight and about 0.03 to about 0.08 mm thickness.

EXAMPLE 3

Materials Characterization

Powder X-Ray diffraction (XRD).

Figure 2:
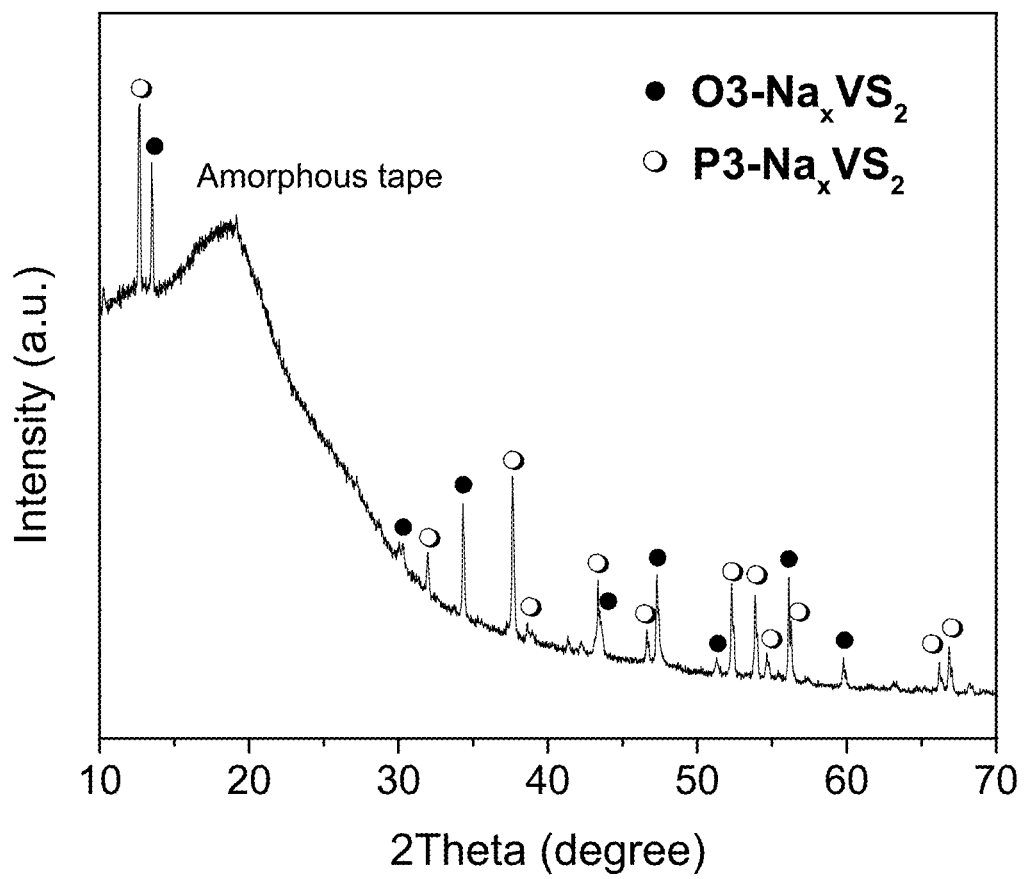
FIG. 2 depicts the powder X-ray diffraction (XRD) pattern of as-prepared $Na_xVS_2$ sample.

Samples of the transition metal chalcogenide of EXAMPLE 1 were finely ground and placed in the sample holder of a diffractometer (Bruker D8 Advance, Cu Kα) and then was sealed with thin amorphous KAPTON tape. For the ex-situ XRD measurements, the cells were discharged or charged to a certain voltage and then disassembled under He. The electrodes then were washed with dry dimethyl carbonate (DMC). The dried electrodes were mounted on the XRD holder and sealed with KAPTON tape for XRD measurements. All operations were performed inside a glove box under a He atmosphere. FIG. 2 shows the results of XRD scans, in which O3 and P3 stacking was observed. Notably, no O1 stacking was evident.

EXAMPLE 4

Figure 3:
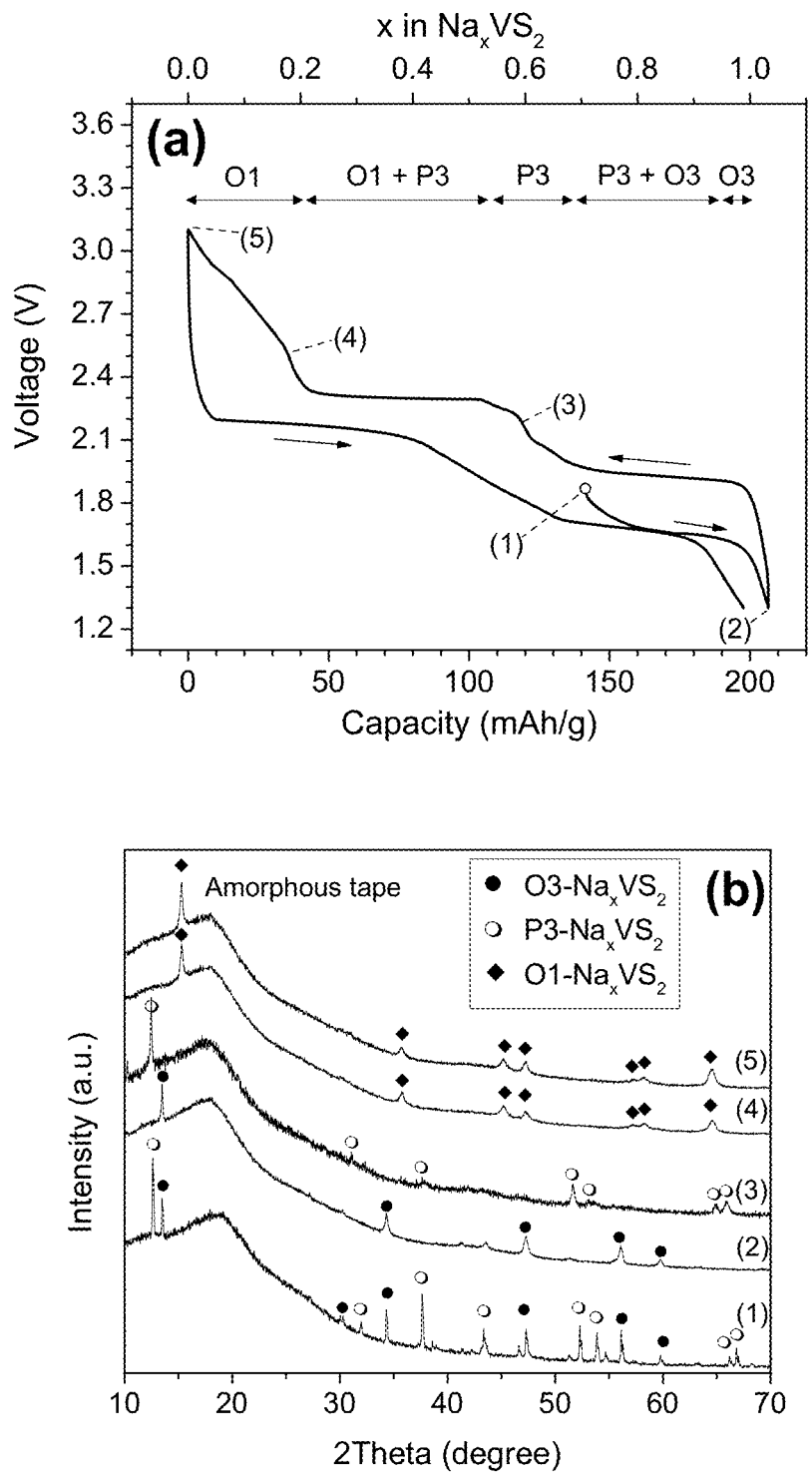
FIG. 3 provides (a) a voltage profile of $Na_xVS_2$ cycled with 1 M $NaClO_4$ in EC:DEC (1:1) electrolyte between 1.3 to 3.1 V at the rate of 15 mA/g and (b) ex-situ XRD patterns of the cycled electrode at the designated voltages: (1) starting phase, (2) discharged to 1.3 V, (3) charged to 2.2 V, (4) charged to 2.5 V, and (5) charged to 3.1 V.

The electrochemical cell of EXAMPLE 2 was cycled between about 1.3 to about 3.1 V at the rate of 15 mA/g, at ambient room temperature. FIG. 3, Panel (a) displays the voltage profile curve of the $Na_xVS_2$ electrode. When the electrochemical cycle was started with a discharge process, the voltage profile curve exhibited a plateau at about 1.7 V and then a rapid drop until the voltage reached the 1.3 V cut-off value. The voltage response, which was seen repeatedly in the following discharge curves, can be associated with electrochemical Na-insertion to octahedral vacancies in Na layers of the $Na_xVS_2$ material to form $NaVS_2$. This confirms that the fresh electrode material was Na-deficient $Na_xVS_2$. The amount of Na electrochemically inserted into the fresh $Na_xVS_2$ electrode during the first discharge was about 0.3 mole per formula unit corresponding to an x value of about 0.7 for the fresh $Na_xVS_2$ electrode. The subsequent charge-discharge cycle of the $Na/Na_xVS_2$ cell, provided in FIG. 3, Panel (a) shows a reversible voltage profile with the specific capacity close to the theoretical value of about 194 mAh/g, indicating that Na can be reversibly cycled with $Na_xVS_2$ in the range of $0<x<1$ at room temperature.

The voltage slopes and corresponding ex-situ XRD patterns, shown in FIG. 3, Panels (a) and (b), respectively, identify the room-temperature solid-solubility ranges of the O3-, P3-, and O1-type phases. Accordingly, the successive flat voltage regions represent the two-phase regions of O3+P3 and P3+O1 phases, as illustrated in in FIG. 3, Panel (a). Because of the highly reducing nature of $O3-NaVS_2$, the as-prepared $NaVS_2$ samples may easily decompose to Na-deficient $Na_xVS_2$ form during the high-temperature synthesis and subsequent sample handling process. Therefore, at the point of analysis, the samples could have been transformed to P3+O3 phases or to a single P3-phase according to the degree of decomposition and consequent x value.

EXAMPLE 5

Figure 4:
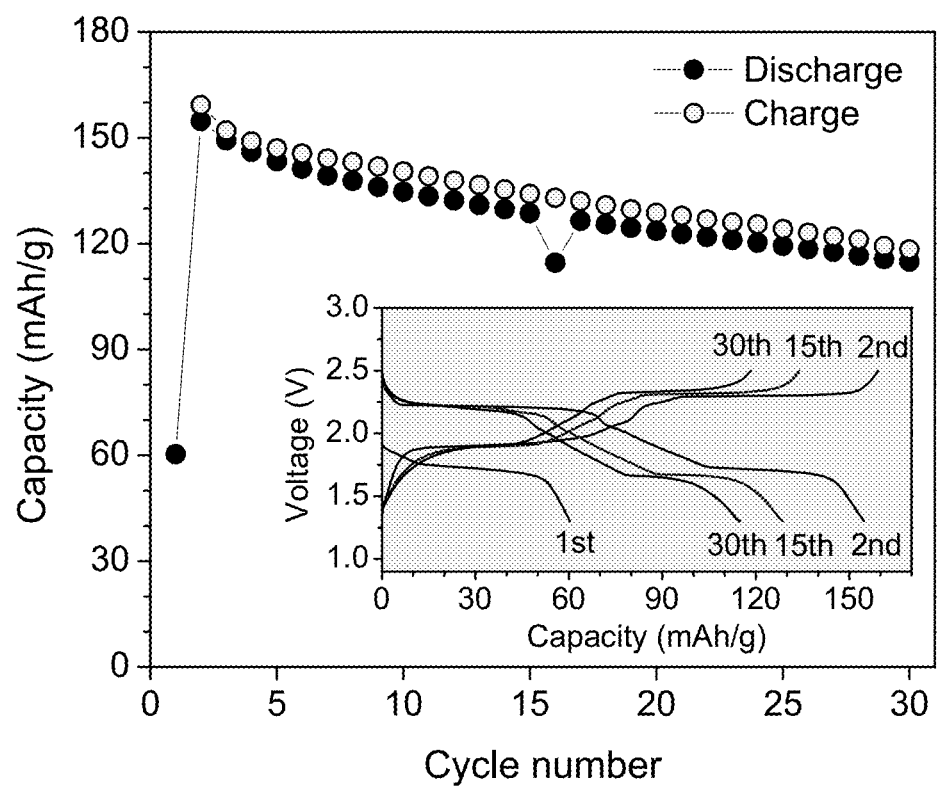
FIG. 4 depicts capacity retention of $Na_xVS_2$ cycled with 1 M $NaClO_4$ in EC:DEC (1:1) electrolyte between 1.3 to 2.5 V at the rate of 15 mA/g; inset shows the voltage profiles of selected cycles.

FIG. 4 shows the plot of capacity retention for the $Na/Na_xVS_2$ cell fabricated in EXAMPLE 2 cycled between about 1.3 to about 2.5 V. The cell was discharged first and the subsequent charge-discharge cycle was designated as the 2nd cycle. The specific discharge capacity at the 2nd cycle was about 155 mAh/g, and about 75% of the initial discharge capacity was retained at 30th cycle. The succeeding voltage profiles of selected cycle numbers (inset of FIG. 4) shows characteristic shape features that are similar to the initial voltage profile indicating a highly reversible layer gliding. The high electrochemical utilization of Na ions in $Na_xVS_2$ is associated with high covalency in the $(VS_2)_n$ host lattice, which reduces the electrostatic repulsion between two adjacent $(VS_2)_n$ slabs. Therefore, as a result of reversible layer gliding, $Na_xVS_2$ can maintain a layered structure even at a very low Na content (i.e. $x<0.5$), where Na is not tightly bound.

EXAMPLE 6

Figure 5:
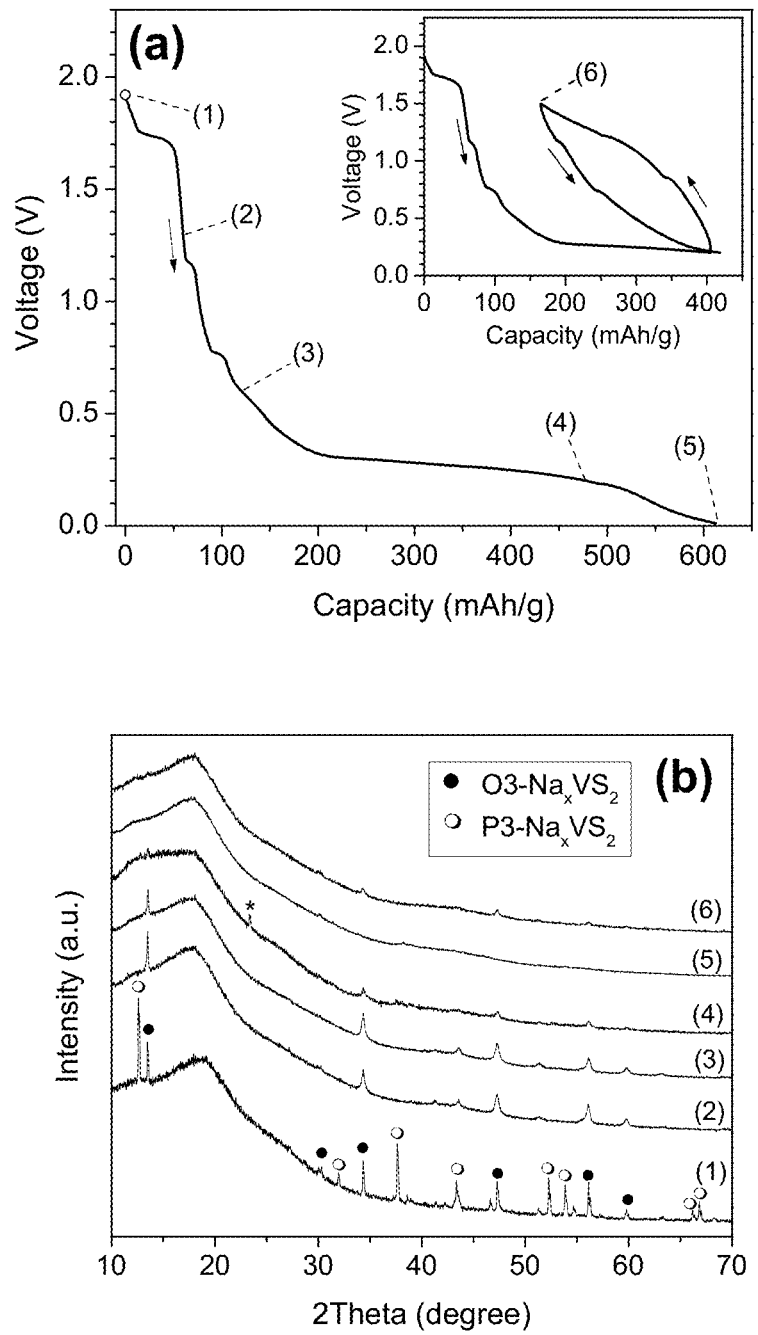
FIG. 5 illustrates (a) a voltage profile of $Na_xVS_2$ discharged to 0.01 V at the rate of 5 mA/g using 1 M $NaClO_4$ in EC:DEC (1:1) electrolyte and (b) ex-situ XRD patterns of the cycled electrode at the designated voltages: (1) starting phase, (2) discharged to 1.3 V, (3) discharged to 0.6 V, (4) discharged to 0.2 V, (5) discharged to 0.01V (6) charged to 1.5 V. Inset of figure (a) shows the voltage profile cycled between 0.2 and 1.5 V; in Panel (b), the peak marked with asterisk is due to the decomposition of phases during XRD measurement.

FIG. 5, Panel (a) shows the voltage profile for the initial discharge of a $Na_xVS_2$ electrochemical cell made as described in EXAMPLE 2. After the plateau at about 1.7 V, corresponding to the initial Na-intercalation into the octahedral vacancy in the Na-layers of $Na_xVS_2$ (x of about 0.7), the further discharge process shows a rapid voltage drop to a plateau at about 0.3 to 0.2 V. In FIG. 5, Panel (b), the corresponding ex-situ XRD patterns show continuous decrease in the peaks for the O3 phase, which completely disappeared when the voltage reached down to about 0.01 V. Once a featureless XRD pattern forms during the discharge process below about 0.6 V, peaks do not evolve again even upon subsequent charging. Therefore, the voltage plateau at 0.3 to 0.2 V can be attributed to a conversion reaction of $NaVS_2$ that involves decomposition and/or formation of amorphous active material. The voltage profiles of the subsequent charge and discharge steps, as shown in the inset of FIG. 5, Panel (a), also exhibit typical voltage responses for conversion electrodes. A possible conversion reaction scheme is: $3Na+NaVS_2 \rightarrow V+2Na_2S$.

EXAMPLE 7

Figure 6:
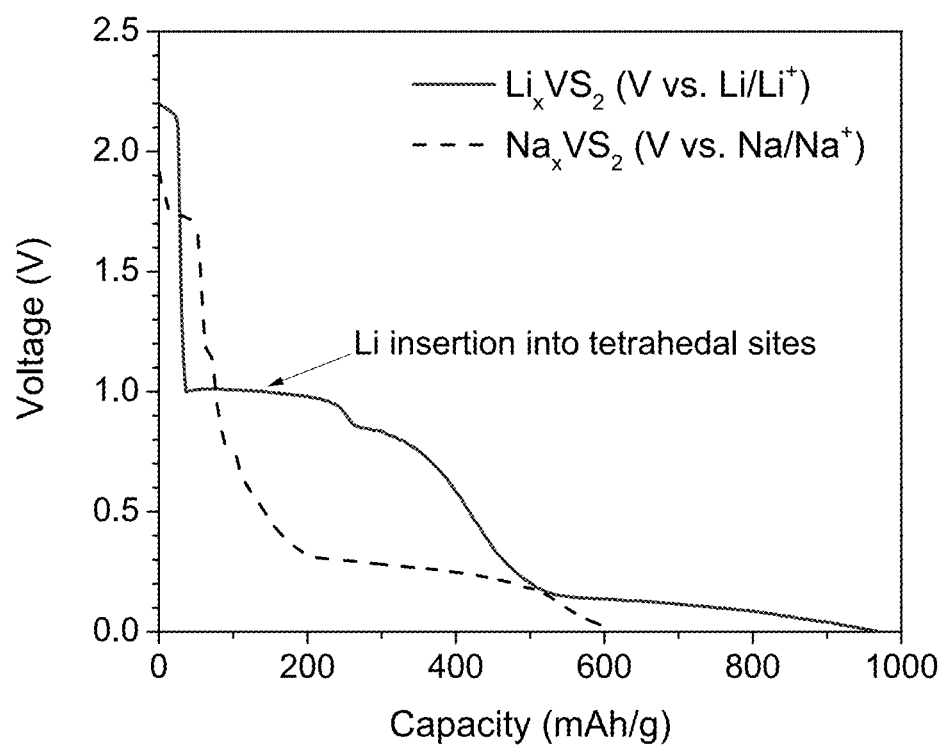
FIG. 6 provide a comparison of first discharge curves of Li/$Li_xVS_2$ and Na/$Na_xVS_2$ cells tested with, respectively, 1M $LiPF_6$ in EC:DEC (1:1) and 1M $NaClO_4$ in EC:DEC (1:1) electrolytes.
Figure 7:
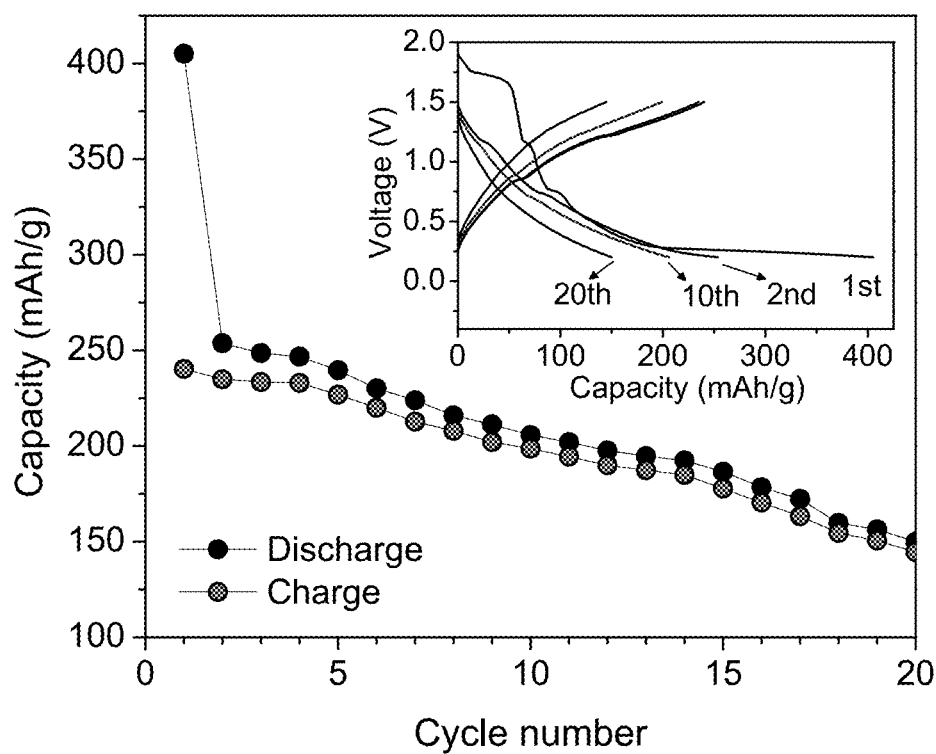
FIG. 7 provides a plot of capacity retention of $Na_xVS_2$ cycled with 1 M $NaClO_4$ in EC:DEC (1:1) electrolyte between 0.2 to 1.5 V at the rate of 15 mA/g; inset shows the voltage profiles of selected cycles.

The voltage response of a $Na_xVS_2$ electrochemical cell made as described EXAMPLE 2 is different from that of a $LiVS_2$ cell, which exhibits a large flat voltage curve at about 1.0 V, corresponding to Li insertion into the tetrahedral sites of Li layers to form $Li_2VS_2$ (FIG. 6). Since there are one octahedral and two tetrahedral sites per vanadium atom in the O3-type $AVS_2$ (A=Li or Na), the additional alkali metal ions inserted into $AVS_2$ needs to occupy the tetrahedral sites. However, the distance between an octahedral site and the adjacent tetrahedral site, which are face-sharing with each other, are too close to be occupied simultaneously, and consequently the introduction of additional alkali metals to tetrahedral sites forces the existing alkali metals at octahedral sites into empty tetrahedral sites, forming an $A_2VS_2$ phase. This takes place as a two phase process resulting in a flat voltage response as seen in the case of Li intercalation into $LiVS_2$. Therefore, the absence of a flat voltage curve between about 1.3 to 0.3 V indicates that Na insertion into the tetrahedral sites of $O3-NaVS_2$ is negligible. This can be attributed to Na ions being too large to be accommodated significantly into the relatively small tetrahedral sites. The ex-situ XRD pattern obtained at 0.6 V, in FIG. 5, Panel (b), supports this premise, in that no peaks associated with $Na_2VS_2$ phase were observed. The cycling of $Na_xVS_2$ (x>1) as an anode is shown in FIG. 7.

EXAMPLE 8

Preparation of $Na_xTiS_2$ $Na_xTiS_2$ was synthesized by a procedure similar to that of EXAMPLE 1, i.e., by mixing appropriate amounts of $Na_2S$, S, and Ti under an Ar atmosphere in a glove box, placing the mixture in a carbon-coated quartz tube that was then sealed under vacuum, and heating the tube slowly over about 20 hours to about 750° C., maintaining that temperature for about three days, and then cooling slowly over about 5 hours to about 250° C. The cooled material was then quenched in air. The resulting product was removed from the tube under Ar in a glove box, where it was thoroughly ground and pelletized. Then pelletized material was then treated again at the same temperatures, heating times, cooling times, and processing. Since this compound is moisture-sensitive, the material was always handled in an Ar atmosphere.

EXAMPLE 9

Figure 8:
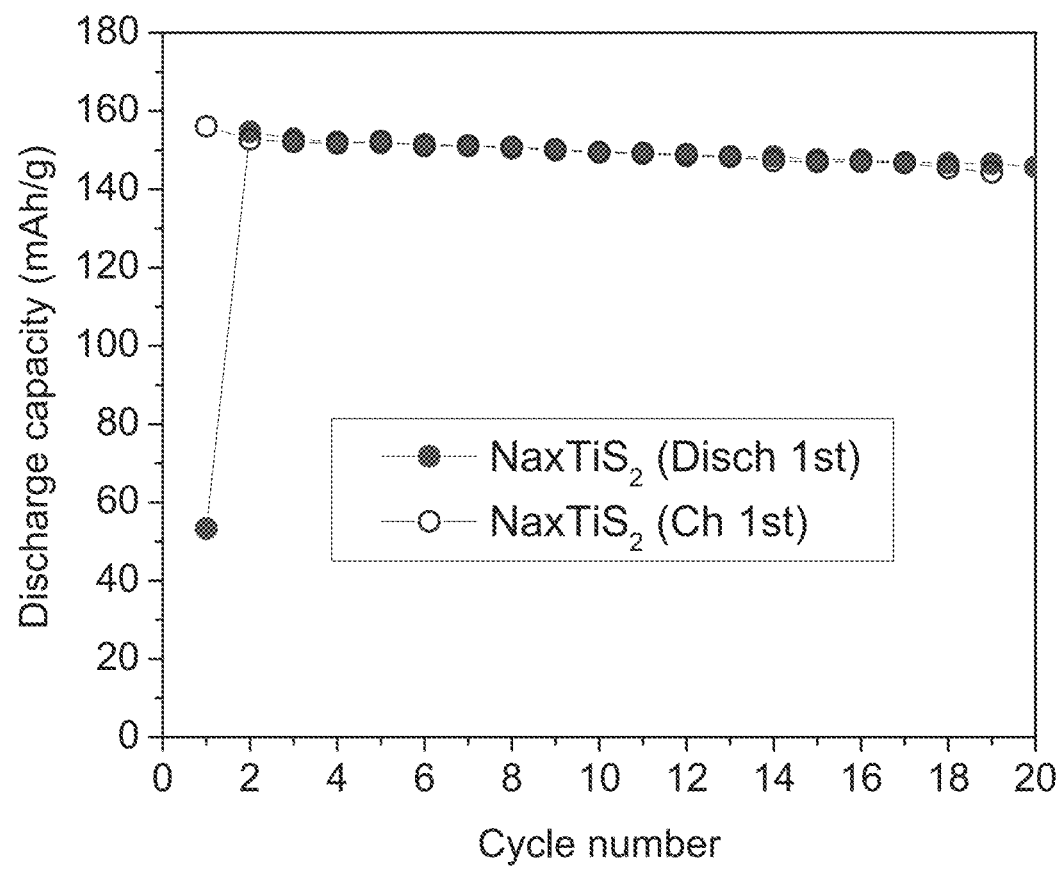
FIG. 8 provides a plot of capacity retention for the Na/$Na_xTiS_2$ cell cycled between 1.0 to 2.5 V.
Figure 9:
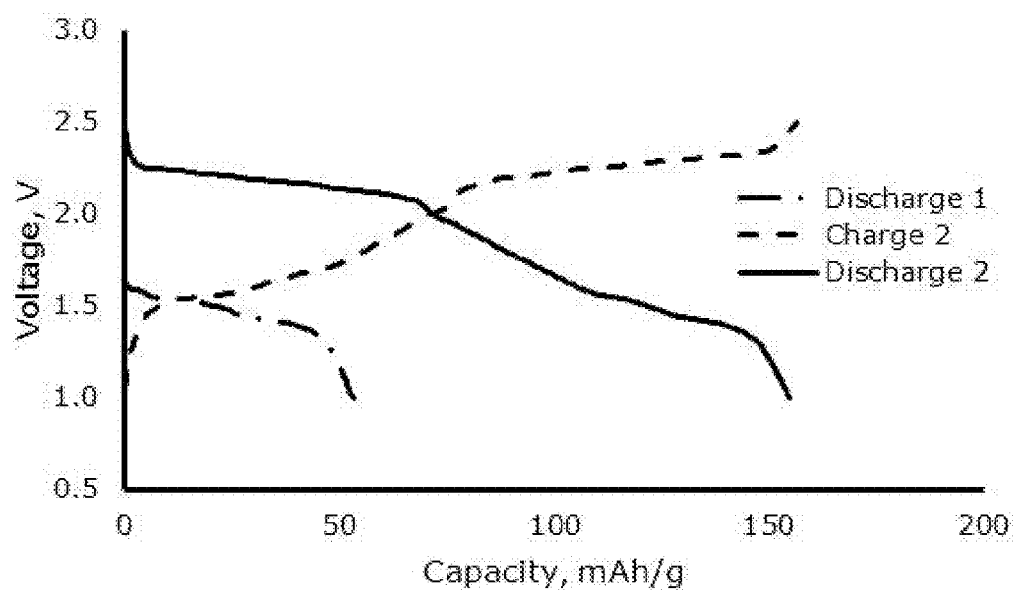
FIG. 9 provides a voltage profile of a Na/$Na_xTiS_2$ cell.

FIG. 8 shows a plot of capacity retention up to 20 cycles for a $Na/Na_xTiS_2$ cell that was fabricated as described in EXAMPLE 2, but using the $Na_xTiS_2$ product of EXAMPLE 8, cycled between about 1.0 to about 2.5 V. The cell was discharged first and the subsequent charge-discharge cycle was designated as the 2nd cycle. The specific discharge capacity at the 2nd cycle was about 153 mAh/g, and about 96% of the initial discharge capacity was retained at 20th cycle. The 1st discharge and subsequent voltage profile (number 2) (FIG. 9) showed characteristic shape features (charge-discharge) that are mirror image to each other indicating a highly reversible layer gliding.

EXAMPLE 10

Preparation of $Na_xTi_{0.5}V_{0.5}S_2$ $Na_xTi_{0.5}V_{0.5}S_2$ was synthesized by mixing appropriate stoichiometric amounts of $Na_2S$, S, Ti, and V under an Ar atmosphere in a glove box, placing the mixture in a carbon-coated quartz tube that was then sealed under vacuum, and heating the tube slowly over about 20 hours to about 750° C., maintaining that temperature for about three days, and then cooling slowly over about 5 hours to about 250° C. The cooled material was then quenched in air. The resulting product was removed from the tube under Ar in a glove box, where it was thoroughly ground and pelletized. Then pelletized material was then treated again at the same temperatures, heating times, cooling times, and processing. Since this compound is moisture-sensitive, the material was always handled in an Ar atmosphere.

EXAMPLE 11

Figure 10:
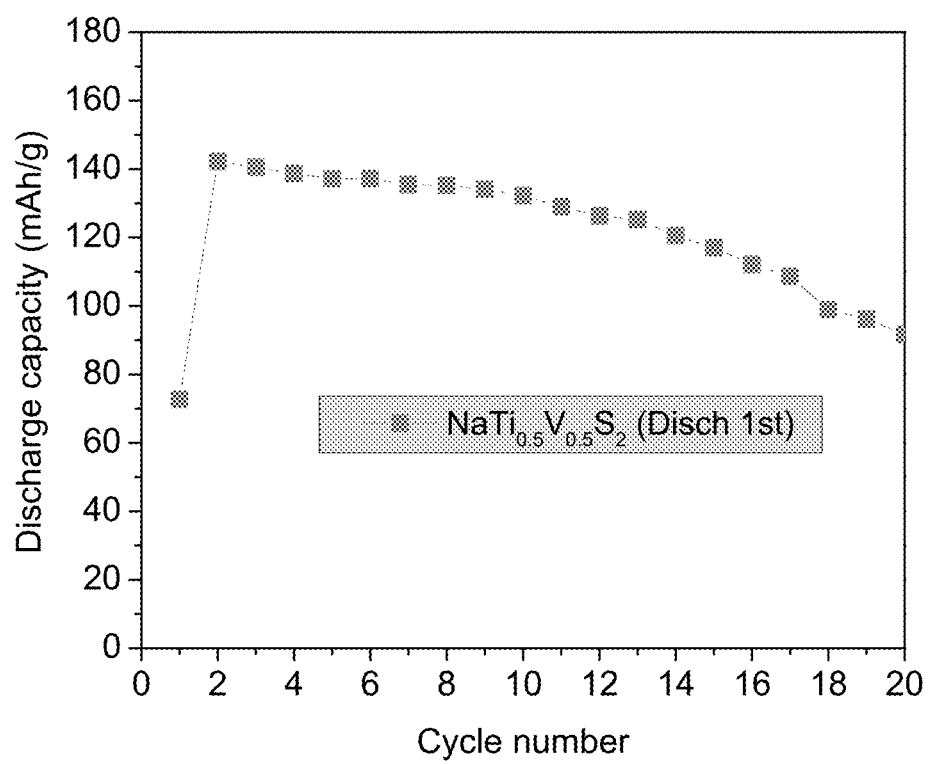
FIG. 10 depicts a plot of capacity retention for a Na/$Na_xTi_{0.5}V_{0.5}S_2$ cell cycled between 1.0 to 2.5 V.
Figure 11:
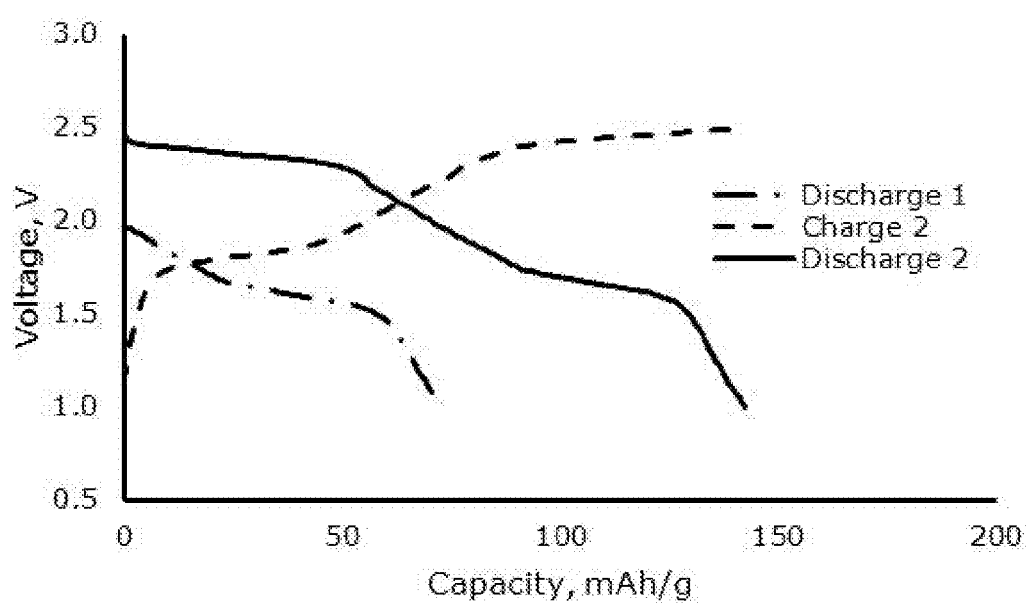
FIG. 11 depicts a voltage profile of a Na/$Na_xTi_{0.5}V_{0.5}S_2$ cell.

FIG. 10 shows a plot of capacity retention up to 50 cycles for a $Na/Na_xTi_{0.5}V_{0.5}S_2$ cell fabricated as described in EXAMPLE 2, using the $NaTi_{0.5}V_{0.5}S_2$ material prepared in EXAMPLE 10, cycled between about 1.0 to about 2.5 V. The cell was discharged first and the subsequent charge-discharge cycle was designated as the 2nd cycle. The specific discharge capacity at the 2nd cycle was about 139 mAh/g, and about 68% of the initial discharge capacity was retained at the 20th cycle. The 1st discharge and subsequent voltage profile (number 2) (FIG. 11) showed characteristic shape features (charge-discharge) that are mirror image to each other indicating a highly reversible layer gliding.

EXAMPLE 12

Figure 12:
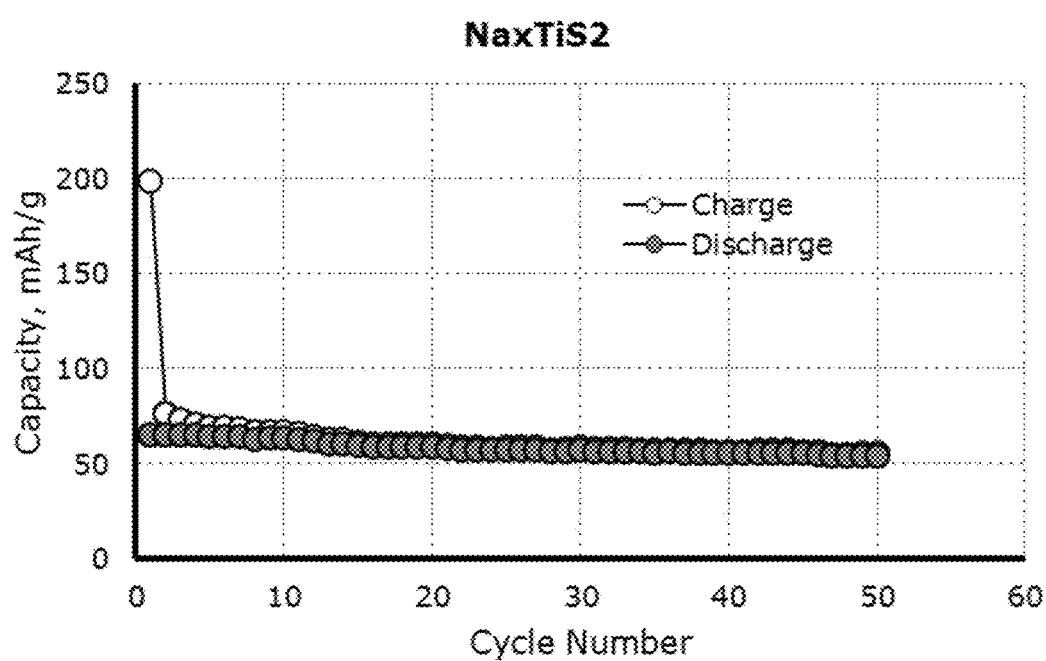
FIG. 12 provides a lot of capacity retention for a Na/$Na_xTiS_2$ cell cycled between 0 to 1.5 V.
Figure 13:
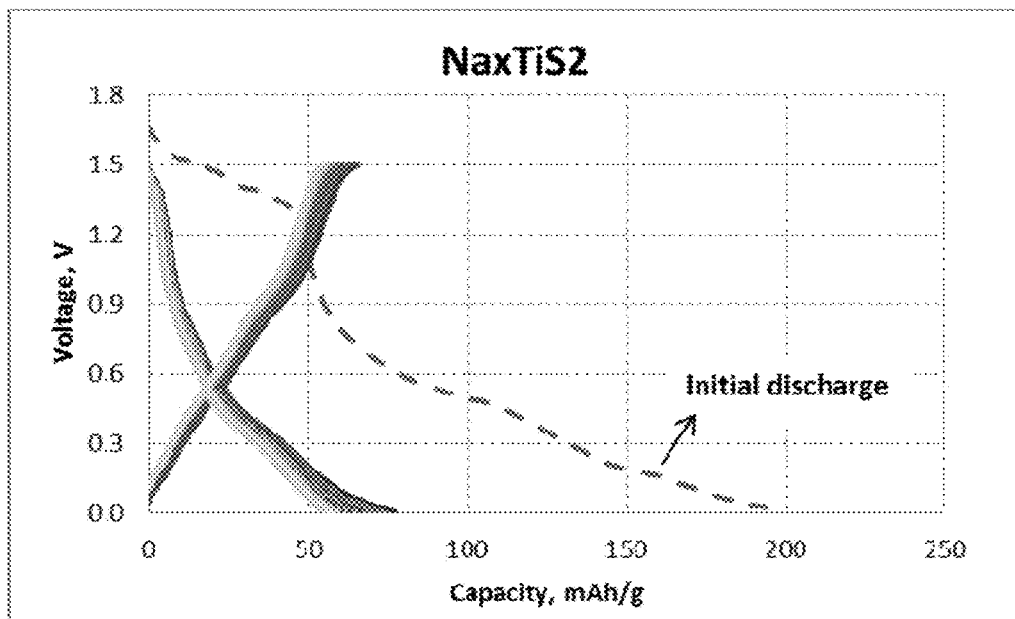
FIG. 13 illustrates the voltage profile of a Na/$Na_xTiS_2$ cell in which the $Na_xTiS_2$ was used as an anode.

FIG. 12 shows a plot of capacity retention up to 50 cycles for a $Na/Na_xTiS_2$ cell prepared according to EXAMPLE 9 cycled between 0 to about 1.5 V. The $Na_xTiS_2$ electrode was used as an anode in this example. The cell was discharged first and the subsequent charge-discharge cycles are shown. The specific discharge capacity at the 2nd cycle was about 66 mAh/g, and about 77% of the initial discharge capacity was retained at 50th cycle. The 1st discharge and subsequent voltage profiles (nos. 2-50) (FIG. 13) showed characteristic shape features (charge-discharge) that are mirror image to each other indicating a highly reversible electrochemical displacement-conversion reaction.

EXAMPLE 13

Figure 14:
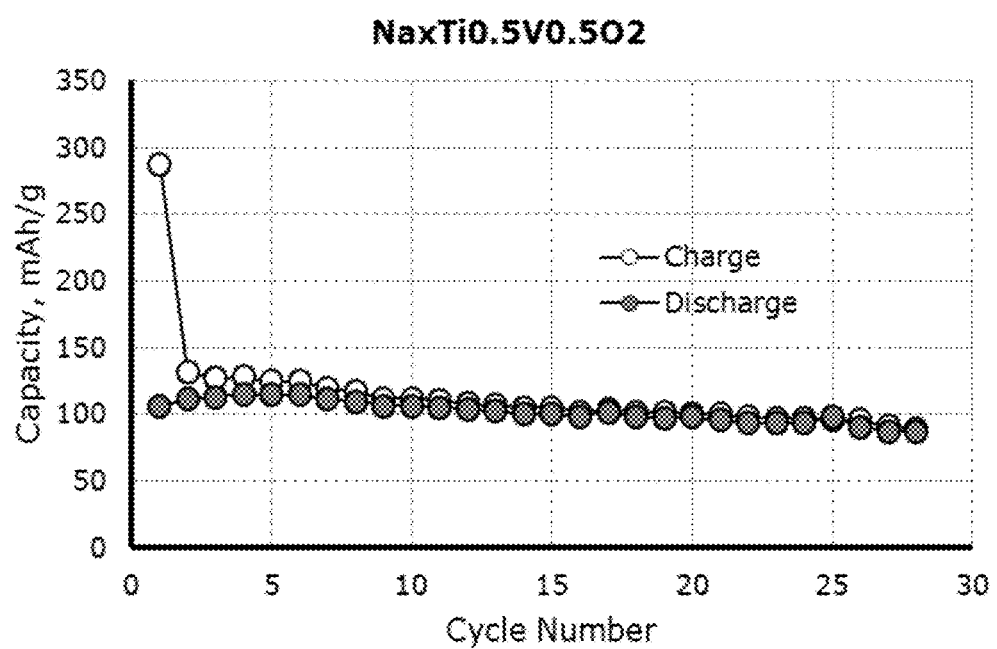
FIG. 14 shows a plot of capacity retention for a Na/$Na_xTi_{0.5}V_{0.5}S_2$ cell cycled between 0 to 1.5 V.
Figure 15:
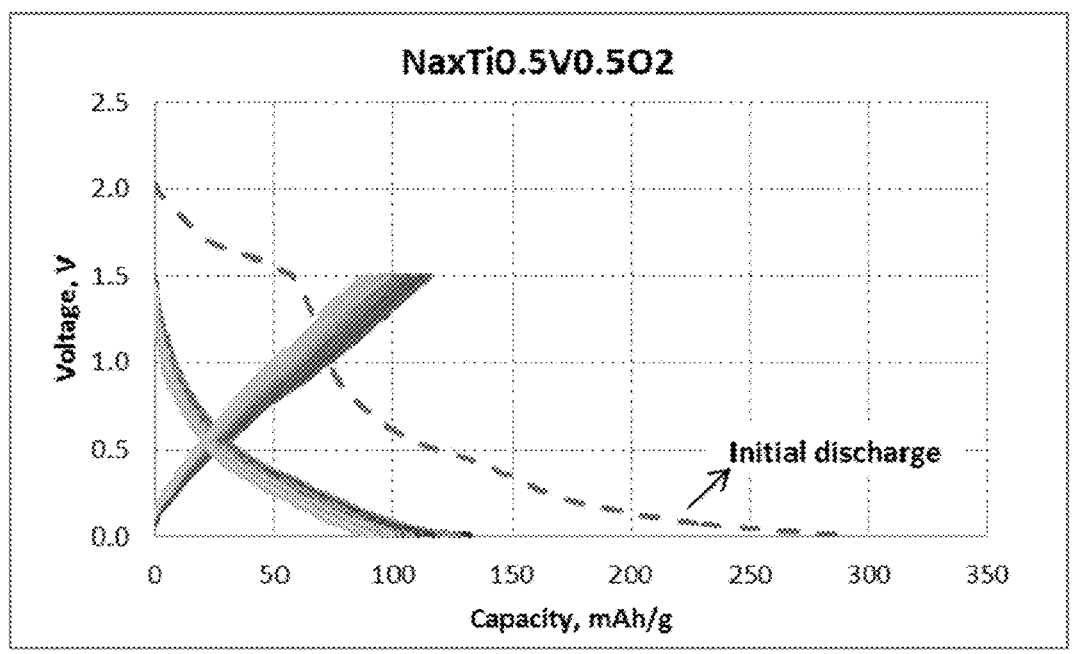
FIG. 15 shows a voltage profile of a Na/$Na_xTi_{0.5}V_{0.5}S_2$ cell in which the $Na_xTi_{0.5}V_{0.5}S_2$ was used as an anode.

FIG. 14 shows a plot of capacity retention up to 29 cycles for a $Na/Na_xTi_{0.5}V_{0.5}S_2$ cell prepared as in EXAMPLE 11 cycled between 0 to about 1.5 V. The electrode was used as an anode in this example. The cell was discharged first and the subsequent charge-discharge cycles are shown. The specific discharge capacity at the 2nd cycle was about 106 mAh/g, and about 82% of the initial discharge capacity was retained at 28th cycle. The 1st discharge and subsequent voltage profiles (nos. 2-30) (FIG. 15) showed characteristic shape features (charge-discharge) that are mirror image to each other indicating a highly reversible electrochemical displacement-conversion reaction.

Discussion.

$Na_xMS_2$, in which M is a 1st row transition metal, has a structure consisting of hexagonal-close-packed sulfur with M and Na ions in alternate octahedral-site (001) planes. On removal of Na, the $MS_2$ layers are held together by van der Waals bonding. Various phases of layered $Na_xMS_2$ have been reported according to the types of the sulfur packing and the sodium ion coordination being octahedral (O) or trigonal prismatic (P). Among them, the schematic diagram of O3-type, P3-type, and O1-type layered structures are presented in FIG. 1. The letters O and P and the following number indicates, respectively, the Na ion coordination geometry and number of $(MS_2)_n$ sheets in the unit cell.

The structure of $Na_xVS_2$ was first reported by Wiegers et al. (*Mater. Res. Bull.*, 1974:9, 1261), who prepared $Na_xVS_2$ samples with various x values by heating elemental Na, V and S at 600° C. for four days in evacuated tube followed by quenching. In their experiment, the quenched $Na_xVS_2$ sample had an x value of $0.3<x<1.0$, and had the P3-type structure (a=3.346 Å and c=21.02 Å) initially. A slow phase transition from the P3-type to O1-type structure was observed when the sample was stored at room temperature for an extended period of time. Accordingly, the authors assigned the P3- and O1-type structures as the high and low temperature phases of $Na_xVS_2$ ($0.3<x<1.0$), respectively (i.e., sodium deficient materials). This assignment of the stable phases to $Na_xVS_2$ compounds is not conclusive since the authors also commented in the same paper that O3-phase (a=3.566 Å and c=19.68 Å) was frequently observed in some of their $NaVS_2$ samples as a second phase or even as a single phase. High temperature synthesis commonly provides sodium deficient layered chalcogenide compounds, and $NaVS_2$ is so reducing, even at room temperature, that it could readily react with $CO_2$ in the environment to form $Na_2CO_3$ on the surface of $NaVS_2$ particles.

The $Na_xMS_2$ materials described herein also are Na-deficient, based on electrochemical analysis, and present both O3- and P3-type phases as evidenced by X-ray diffraction of $Na_xVS_2$ described herein (XRD pattern fitted and indexed with both O3-type and P3-type phases by Le Bail whole-powder pattern decomposition method (*Mater. Res. Bull.*, 1988:23, 447)).

Reversible electrochemical deintercalation of about one Na (x=1) per formula unit of $Na_xVS_2$ is disclosed herein, corresponding to a capacity of about 200 mAh/g. A stable capacity of about 120 mAh/g after 30 cycles also was observed. A room-temperature phase diagram of $Na_xVS_2$ ($0<x<1$) has been constructed by monitoring cell potential as a function of Na content, x, during the deintercalation, and the stable phase for $NaVS_2$ was determined as the O3-type structure. While $Na_xVS_2$ shows O3-type, P3-type, and O1-type phase transitions during the whole range of deintercalation from x=1.0 to x=0, more stable performance could be achieved when the material was cycled out of the single O1 phase region.

Electrochemical Cells and Batteries.

Figure 16:
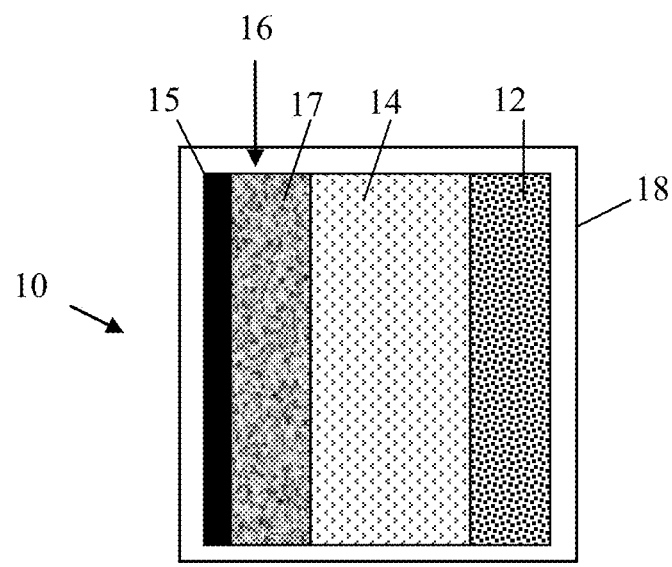
FIG. 16 depicts a schematic representation of an electrochemical cell of the invention.
Figure 17:
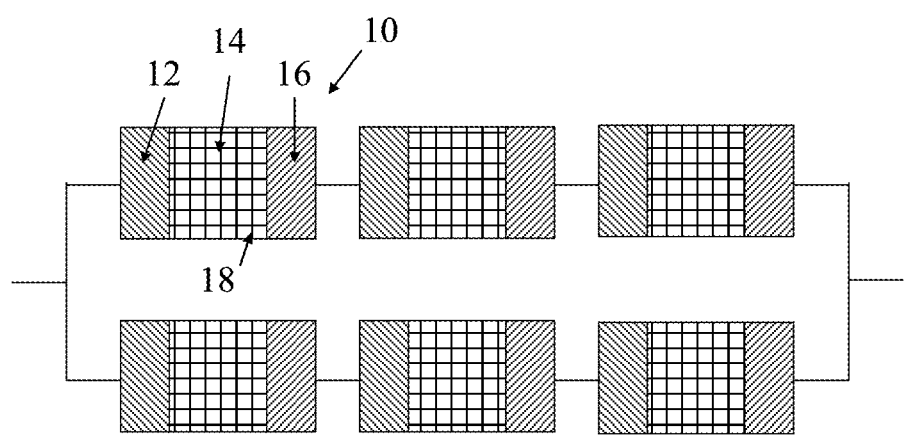
FIG. 17 depicts a schematic representation of a battery consisting of a plurality of cells of the invention connected electrically in series and in parallel.

An electrochemical cell as described herein is shown schematically in FIG. 16. Cell 10 comprises negative electrode 12 separated from positive electrode 16 by an electrolyte 14, all contained in insulating housing 18 with suitable terminals (not shown) being provided in electronic contact with negative electrode 12 and positive electrode 16 of the invention. Positive electrode 16 comprises metal current collector foil 15 and active layer 17 comprising the transition metal chalcogenide compound (along with the carbon and binder, if utilized) material as described herein. Binders and other materials, such as carbon, normally associated with both the electrolyte and the negative and positive electrodes are well known in the art and are not described herein. FIG. 17 provides a schematic illustration of one example of a battery in which two strings of electrochemical sodium cells 10, described above, are arranged in parallel, each string comprising three cells 10 arranged in series.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments of the invention in which an exclusive property or privilege is claimed are defined as follows:

1. A sodium-ion electrochemical cell capable of operating at an ambient temperature of 20 to 25° C. and comprising a cathode, an anode, and a non-aqueous sodium-containing electrolyte therebetween; wherein the electrolyte comprises a sodium salt dissolved in a liquid organic carrier; the cathode comprises at least one transition metal chalcogenide compound in an initial discharged or partially discharged state and having the formula $Na_xMX_2Cl_n$ prior to first discharge of the cell, wherein $0<x\leq1$; M is a transition metal having a +3, +4, or +5 fully discharged oxidation state, when x is 1; X is at least one chalcogen selected from the group consisting of S and Se; and n is 0 when the discharged oxidation state of M is +3, n is 1 when the discharged oxidation state of M is +4, and n is 2 when the discharged oxidation state of M is +5.

2. The electrochemical cell of claim 1 wherein each M independently is a transition metal selected from the group consisting of V, Ti, Ta, Zr, and Nb.

3. The electrochemical cell of claim 1 wherein each M independently is V or Ti.

4. The electrochemical cell of claim 1 wherein X is S.

5. The electrochemical cell of claim 1 wherein each M independently is V or Ti, and X is S.

6. The electrochemical cell of claim 1 wherein the organic carrier comprises at least one solvent selected from the group consisting of an organic carbonate, an organic ether, an organic ester, and an organic nitrile.

7. The electrochemical cell of claim 1 wherein the sodium salt comprises $NaPF_6$, $NaBF_4$, $NaF_2BC_2O_4$, $NaB(C_2O_4)_2$, $NaClO_4$, $NaAsF_6$, $NaN(SO_2CF_3)_2$, $NaC(SO_2CF_3)_3$, $NaSO_3CF_3$, $NaPF_3(CF_2CF_3)_3$, or a combination of two or more of the foregoing salts.

8. The electrochemical cell of claim 1 wherein the at least one transition metal chalcogenide compound is a particulate material and the cathode is a composite comprising a layer of the particulate transition metal chalcogenide compound and, optionally, carbon particles, disposed on a metal current collector.

9. The electrochemical cell of claim 8 wherein the layer of the particulate transition metal chalcogenide compound and the carbon particles further comprises a binder.

10. The electrochemical cell of claim 9 wherein binder comprises poly(vinylidene difluoride).

11. The electrochemical cell of claim 8 wherein the carbon particles are selected from the group consisting of carbon nanotubes, carbon nanoparticles, and carbon microparticles.

12. The electrochemical cell of claim 8 wherein particles of the particulate transition metal chalcogenide compound are nanoparticles, microparticles, or a combination thereof.

13. The electrochemical cell of claim 8 wherein the metal current collector comprises a metal selected from the group consisting of aluminum, stainless steel, copper, nickel, and an alloy of two or more of the foregoing metals.

14. A sodium-ion electrochemical cell capable of operating at an ambient temperature of 20 to 25° C. and comprising a cathode, an anode, and a non-aqueous sodium-containing electrolyte therebetween; wherein the cathode comprises at least one transition metal chalcogenide compound in an initial discharged or partially discharged state and having the formula $Na_xMS_2$ prior to first discharge of the cell, wherein M is selected from the group consisting of V and Ti; $0<x\leq1$; and the electrolyte comprises a sodium salt dissolved in a liquid organic carrier comprising at least one solvent selected from an organic carbonate, an organic ether, an organic ester, and an organic nitrile.

15. The electrochemical cell of claim 14 wherein the cathode comprises a transition metal chalcogenide compound of formula $Na_xVS_2$ and a transition metal chalcogenide compound of formula $Na_xTiS_2$.

16. The electrochemical cell of claim 14 wherein the sodium salt comprises $NaPF_6$, $NaBF_4$, $NaF_2BC_2O_4$, $NaB(C_2O_4)_2$, $NaClO_4$, $NaAsF_6$, $NaN(SO_2CF_3)_2$, $NaC(SO_2CF_3)_3$, $NaSO_3CF_3$, $NaPF_3(CF_2CF_3)_3$, or a combination of two or more of the foregoing salts.

17. The electrochemical cell of claim 14 wherein the $Na_xMS_2$ is a particulate material, and the cathode is a composite comprising a layer of the particulate $Na_xMS_2$ and carbon particles disposed on a metal current collector.

18. The electrochemical cell of claim 17 wherein the layer of particulate $Na_xMS_2$ and the carbon particles further comprises a binder.

19. The electrochemical cell of claim 18 wherein binder comprises poly(vinylidene difluoride).

20. The electrochemical cell of claim 17 wherein the carbon particles are selected from the group consisting of carbon nanotubes, carbon nanoparticles, and carbon microparticles.

21. The electrochemical cell of claim 17 wherein the particles of the $Na_xVS_2$ are nanoparticles, microparticles, or a combination thereof.

22. A sodium-ion battery comprising a plurality of electrochemical cells of claim 1 electrically connected together in series, in parallel, or a combination of series and parallel.

23. A sodium-ion battery comprising a plurality of electrochemical cells of claim 14 electrically connected together in series, in parallel, or a combination of series and parallel.

* * * * *

UNITED STATES PATENT AND TRADEMARK OFFICE
CERTIFICATE OF CORRECTION

PATENT NO.        : 8,906,542 B2
APPLICATION NO.   : 13/709877
DATED             : December 9, 2014
INVENTOR(S)       : Christopher Johnson et al.

Page 1 of 1

It is certified that error appears in the above-identified patent and that said Letters Patent is hereby corrected as shown below:

IN THE CLAIMS:

Column 12, claim 4, line 6, delete "Xis" and insert --X is--.

Signed and Sealed this
Seventh Day of April, 2015

Michelle K. Lee
*Director of the United States Patent and Trademark Office*